United States Patent
Gilbert et al.

(10) Patent No.: US 8,602,491 B2
(45) Date of Patent: Dec. 10, 2013

(54) SEAT FOR A MOTOR VEHICLE

(75) Inventors: Tassilo Gilbert, Pforzheim (DE); Dieter Jungert, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 249 days.

(21) Appl. No.: 13/028,259

(22) Filed: Feb. 16, 2011

(65) Prior Publication Data

US 2011/0215625 A1 Sep. 8, 2011

(30) Foreign Application Priority Data

Mar. 4, 2010 (DE) .......................... 10 2010 000 635

(51) Int. Cl.
*B60N 2/42* (2006.01)
*A47C 1/00* (2006.01)

(52) U.S. Cl.
USPC ................. 297/216.1; 297/216.16; 297/330; 297/344.17; 297/362.11

(58) Field of Classification Search
USPC ............................ 297/362.11, 216.16, 216.1
See application file for complete search history.

(56) References Cited

U.S. PATENT DOCUMENTS

| | | | | |
|---|---|---|---|---|
| 4,786,110 A * | 11/1988 | Mahling et al. | ................ | 297/362 |
| 4,930,841 A * | 6/1990 | Wittig | ........................ | 297/378.12 |
| 5,306,073 A | 4/1994 | Rees | | |
| 5,470,129 A * | 11/1995 | Ferrero | ........................ | 297/330 |
| 6,106,071 A * | 8/2000 | Aebischer et al. | ........ | 297/452.18 |
| 6,851,753 B2 | 2/2005 | Akaike et al. | | |
| 7,100,985 B2 * | 9/2006 | Wagner et al. | ............ | 297/362.11 |
| 7,261,373 B2 * | 8/2007 | Tanaka et al. | ............ | 297/216.13 |
| 7,677,665 B2 * | 3/2010 | Eppert et al. | ............. | 297/362.11 |
| 7,976,103 B2 * | 7/2011 | Gamache et al. | ........ | 297/362.11 |
| 8,052,215 B2 * | 11/2011 | Ito | .............................. | 297/362.11 |
| 8,193,755 B2 * | 6/2012 | Jensen et al. | .................. | 318/687 |
| 2010/0187396 A1 | 7/2010 | Gilbert et al. | | |

FOREIGN PATENT DOCUMENTS

DE 10 2006 005 966 8/2007

* cited by examiner

*Primary Examiner* — Sarah B McPartlin
(74) *Attorney, Agent, or Firm* — Gerald E. Hespos; Michael J. Porco; Matthew T. Hespos

(57) ABSTRACT

An adjustable seat structure (1) extends over substantially the width of the seat. An electric drive unit (12) is on one side (4) of the seat but adjusts the seat structure (1) on both sides of the seat. Locks (17) for fixing the seat structure (1) are provided on both sides. The seat ensures a structurally simple adjustment and fixing of the seat on both sides. The adjustment forces are transmitted by the seat structure from the drive unit located on one side of the seat to the other side of the seat.

7 Claims, 2 Drawing Sheets

SEAT FOR A MOTOR VEHICLE

CROSS REFERENCE TO RELATED APPLICATION

This application claims priority under 35 USC 119 to German Patent Application No. 10 2010 000 635.1, filed Mar. 4, 2010, the entire disclosure of which is incorporated herein by reference.

BACKGROUND OF THE INVENTION

1. Field of the Invention

The invention relates to a seat for a motor vehicle, with an adjustable seat structure extending substantially over the width of the seat, an electric drive unit arranged on one side of the seat for adjusting the seat structure on both sides of the seat, and with means for fixing the seat structure on both sides.

2. Description of the Related Art

The functions of electrically adjustable seats for motor vehicles largely must be adjusted simultaneously on the left and the right side of the seat. This is the case, for example, for the longitudinal adjustment, the height adjustment, the inclination adjustment or the backrest inclination adjustment of the seat.

DE 10 2006 005 966 A1 relates to the height adjustment of an electrically adjusted seat. The seat has two lateral frames mounted pivotably in pivoting arms that are mounted pivotably in the vehicle bodywork. The frames are connected at the front and rear by tubes arranged therebetween. The seat structure formed in this manner can be raised and lowered by an electric drive arranged on one side of the seat structure and in the region of an outer side of a frame. The seat structure has locking elements on the mutually facing sides of the frames to fix the seat structure in the event of a crash. The locking elements are activated in the event of a crash and engage in toothed segments connected to the frame in a rotationally fixed manner.

The arrangement described DE 10 2006 005 966 A1 accordingly forms a framework having frames that can be raised and lowered. To raise and lower the framework, the adjustment forces have to be transmitted from one side of the seat to the other side of the seat via the tubes connecting the two frames. The tubes and the mounting thereof cause an increased outlay on production and installation and an increased weight. Additionally, the actual structure that receives the seat cushion of the motor vehicle seat has to be mounted in the framework.

U.S. Pat. No. 5,306,073 discloses a seat structure consisting of light metal cast parts that can be adjusted on one side by a motor-transmission unit. However, there are no separate locking units to be used in the event of a crash. This is disadvantageous in terms of safety since there is locking only on one side in the transmission.

It is the object of the invention to develop a seat with a structurally simple design, a structurally simple adjustment and a fixing of the seat on both sides.

SUMMARY OF THE INVENTION

The object is achieved in that the seat structure is a structure for receiving a seat cushion or a backrest cushion.

The invention relates to a rigid seat structure to which a non-rigid seat cushion or the non-rigid backrest cushion are mounted. The seat structure is distinguished by a high degree of rigidity. Thus, an adjustment movement introduced at one side of the seat can be transmitted to the other side of the seat due to the rigidity of the seat structure.

The seat structure preferably is manufactured as a light metal cast part made, from example, from magnesium. The rigidity and light weight of such a seat structure enable adjustments to be carried out by an electric drive unit on only one side of the seat. The electric drive unit preferably comprises a motor and a transmission. Accordingly, the motor and transmission, for adjusting, for example, the seat height, are located either only on the right side of the seat or only on the left side of the seat. The high degree of rigidity of the seat structure enables the adjustment movement to be transmitted by the seat structure from one side of the seat on which the motor and transmission are located to the other side of the seat on which no motor and no transmission are located.

Forces that arise during the adjustment of the seat by the motor and transmission of the drive unit therefore are transmitted from one side of the seat to the other side of the seat by the structure. By contrast, the seat is subjected to substantially higher forces in the event of an accident, for example in the event of the vehicle being in a crash, than during the adjustment of the seat. These forces now are absorbed by means for fixing the seat structure arranged on the respective right and left sides of the seat. The means for fixing the seat structure on both sides of the seat may be effective in different ways, but preferably act by locking or a frictional force connection. The seat structure may be fixed, for example, by self-locking or actively, in particular electromechanically via bolts.

The means for fixing the seat structure are assigned to the respective adjustment means, such as the height adjuster, inclination adjuster, etc. The means, in particular the locking units, are realized, for example, as a freewheel. The freewheel is triggered, for example, if a limit with regard to speed, acceleration, mass inertia/centrifugal force, etc., is exceeded at the seat. Alternatively, electrically actuable means may be provided for fixing the seat structure, such as electric locking units that are activated via a control signal. One locking unit may be used on the right side of the seat and one locking unit on the left side. Thus, the transmission can have a high degree of efficiency since the transmission does not have to be self-locking. As an alternative, the means for fixing the seat structure on that side of the seat that faces away from the electric drive unit can be a locking unit, and the transmission can be a self-locking transmission. In the case of the transmission, the means for fixing the seat structure may be means for fixedly locking the transmission. Accordingly, only one locking unit is used on the side of the seat on which there is no electric drive unit. In this case, a self-locking transmission is used. The self-locking transmission has a lower degree of efficiency, but there is no need to provide a separate locking unit on this side of the seat.

DETAILED DESCRIPTION OF THE PREFERRED EMBODIMENT

Figure 1:
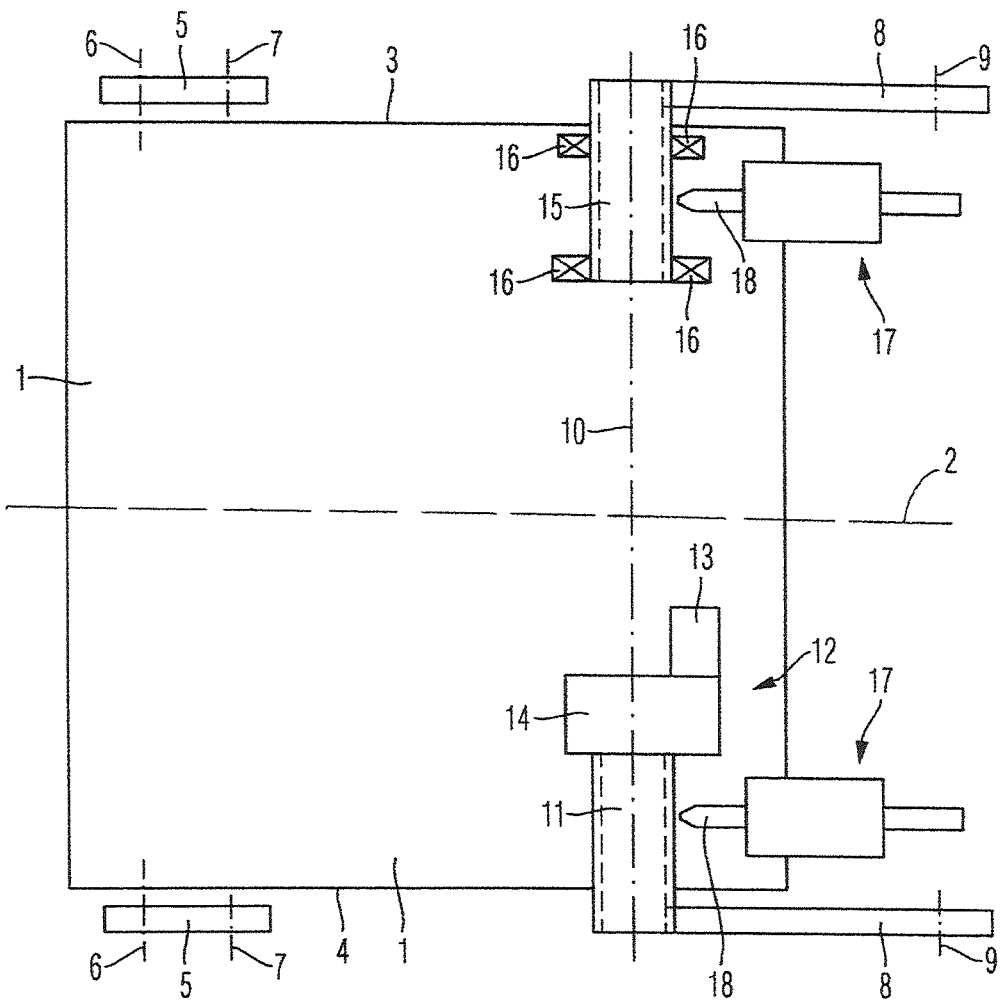
FIG. 1 is a schematic illustration of a seat structure in accordance with one embodiment of the invention.

A seat for a passenger vehicle has the actual seat and a backrest connected pivotably to the actual seat. With regard to the actual seat, only the seat structure and the mounting thereof and the other details relevant to the invention are illustrated in FIG. 1.

The seat structure 1 is a structure for receiving a seat cushion. The seat structure 1 is designed, for example, as a plate-like or frame-shaped component that preferably is cast formed from magnesium. The seat structure 1 extends substantially over the width of the seat. The center plane of the seat is identified by the reference number 2. The plane runs vertically and perpendicularly to the sheet of the drawing by means of the chain-dotted line.

The seat structure 1 has a right side 3 and a left side 4 spaced laterally with respect to the forward direction of travel of the vehicle. Front links 5 are mounted to the front end of the seat structure 1 at the respective right and left sides 3 and 4. Each front link 5 has a first end connected pivotally to the seat structure 1 for pivoting about a transverse axis 6. Each front link 5 also has a second end mounted pivotably in a bodywork floor (not illustrated) or in a rail of the motor vehicle for pivoting about a transverse axis 7. Correspondingly, pivoting arms 8 are mounted to the rear end of the seat structure 1 at the respective left and right sides 3 and 4. Each pivoting arm 8 has a first end connected pivotally in the bodywork floor or the seat rail for pivoting about a lower axis 9. The end of the pivoting arm 8 that faces away from the lower axis 9 is designed as a toothed segment.

A pinion shaft 11 is pivotable about an axis 10 and defines an output shaft of an electric drive unit 12 that is mounted on the left side of the seat structure 1. The electric drive unit 12 has a motor 13 and a transmission 14. A pinion section of the pinion shaft 11 engages in the toothed segment of the left pivoting arm 8. A splined shaft 15 is connected in a rotationally fixed manner to the right pivoting arm 8 and is mounted rotatably in bearings 16 for pivoting about the axis 10. The pitch of the splined shaft 15 corresponds to the pitch of the pinion of the pinion shaft 11.

The height of the seat can be adjusted due to the mounting in the four pivoting arms 5 and 8. More particularly, the height is adjusted by a pivoting force introduced by the drive unit 12 into the pivoting arm 8 on the left side 4 of the seat structure 1. A second drive for pivoting the pivoting arm 8 on the right side 3 is not required because the seat structure 1, which has a high degree of rigidity, transmits the force for raising and lowering the seat structure 1 from the left side 4 to the right side 3 without the seat structure being deformed.

Figure 2:
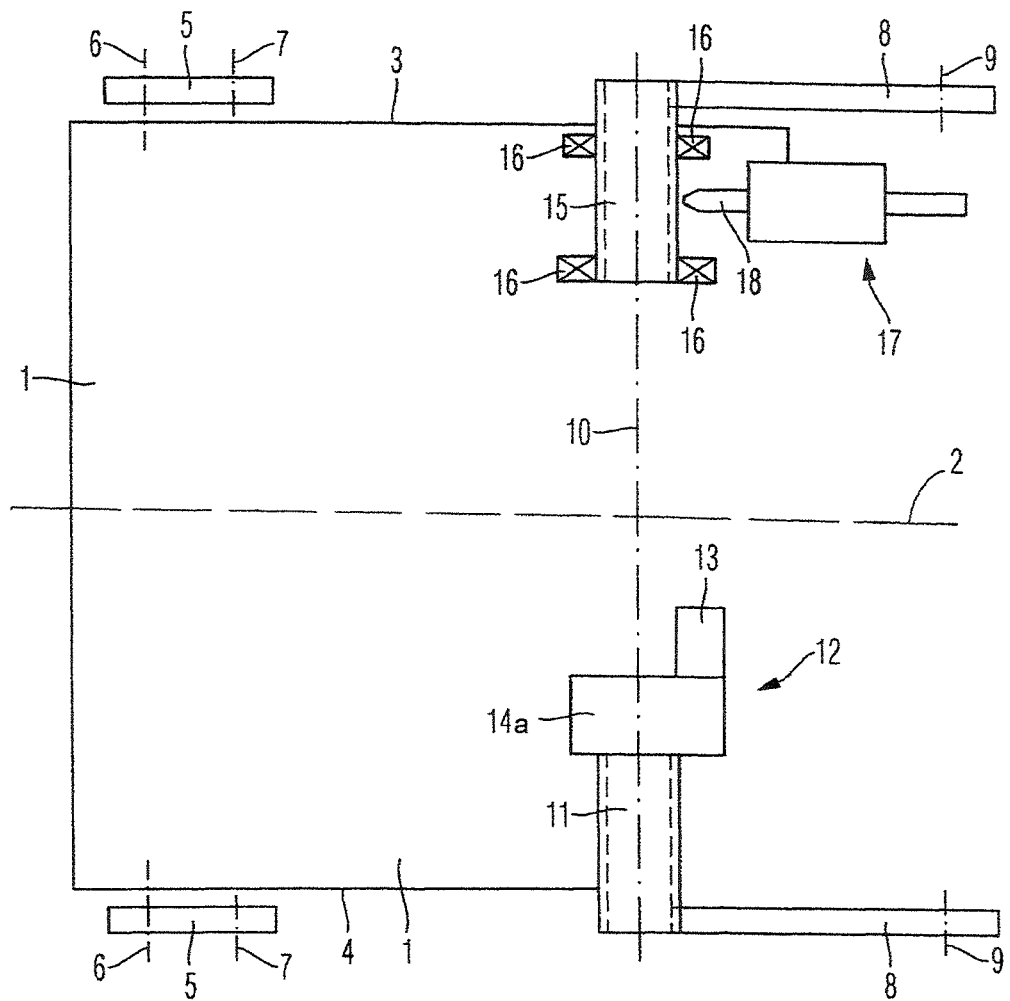
FIG. 2 is a schematic illustration of a seat structure in accordance with a second embodiment of the invention.

The transmission 14 is preferably a non self-locking transmission, and therefore has a high degree of efficiency. Alternatively, as shown in FIG. 2, the transmission can be a self-locking transmission 14a.

Locking units 17 are mounted in the seat structure 1 in the regions of the respective rear pivoting arms 8. Each locking unit 17 has a mechanically extendable locking pin 18. The extended locking pins 18 engage with the pinion of the pinion shaft 11 and splines of the splined shaft 15. The locking unit 17 is an electrically acting locking unit and locks in an unenergized state. Accordingly, the locking pins 18 are in the unlocked position only when the seat is moved. The seat is subjected to greater forces in the event of an accident, for example in the event of the vehicle being involved in a crash, as compared to when the seat is adjusted by the drive unit 12. However, the seat structure 1, and therefore the seat as a whole, is blocked assuredly at the set height via the effective locking pins 18. Although the blocking takes place on both sides, the rigid design of the seat structure 1 also is advantageous in this state to avoid deformation of the arrangement of the seat structure 1 and pivoting frames 5 and 8 due to deformation of the seat structure 1.

FIG. 1 shows the drive unit 12 and the locking unit 17 with solid lines although those units are located at the illustrated location below the seat structure 1. The top of the seat structure 1 receives the seat cushion of the motor vehicle. The seat cushion is substantially configured so that the lateral, front and rear boundaries thereof substantially coincide with the boundaries of the seat structure 1.

What is claimed is:

1. A seat for a motor vehicle, the seat having opposite first and second sides and comprising:
   a rigid seat structure extending substantially over an entire width of the seat from the first side to the second side and configured for receiving a seat cushion or a backrest cushion,
   an electric drive unit for adjusting at least one of a height, longitudinal position and inclination of at least part of the seat structure for the seat cushion or inclination of the seat structure for the backrest cushion, the electric drive unit being arranged on the first side of the seat for applying seat adjusting forces only to one location on the seat structure at the first side of the seat,
   first locking means disposed on the first side of the seat for locking the position of the seat structure at the first side of the seat when predetermined variables caused by kinematics of the vehicle are exceeded; and
   second locking means disposed on the second side of the seat for locking the position of the seat structure at the second side of the seat when predetermined variables caused by kinematics of the vehicle are exceeded, the second locking means being unconnected to the electric drive unit and the first locking means, wherein the first and second sides of the seat are adjusted in response to the seat adjusting forces applied only at the one location on the rigid seat structure at the first side of the seat.

2. The seat of claim 1, wherein the seat structure is a light metal cast part.

3. The seat of claim 1, wherein the first and second locking means for fixing the seat structure are first and second locking units.

4. The seat of claim 1, wherein the respective means for fixing the seat structure is electrically activated.

5. The seat of claim 1, wherein the means for fixing the seat structure are electrically acting and lock in the unenergized state.

6. A seat for a motor vehicle, comprising:
   a seat structure having opposite first and second sides extending substantially over an entire width of the seat and configured for receiving a seat cushion or a backrest cushion;
   an electric drive unit on the first side of the seat for adjusting a position of the seat structure on both sides of the seat structure;
   a pinion shaft projecting from the electric drive unit and disposed at the first side of the seat structure;
   a spline shaft disposed at the second side of the seat structure and aligned coaxially with the pinion shaft, the spline shaft being unconnected to the electric drive unit;
   a first locking means on the first side of the seat structure for engaging the pinion shaft and locking the position of the seat structure; and
   a second locking means on the second side of the seat structure for engaging the spline shaft and locking the position of the seat structure.

7. The seat of claim 6 wherein the first and second locking means are electrically operated to disengage from the pinion shaft and the spline shaft respectively only when the electric drive unit is operated for adjusting the position of the seat structure.

* * * * *